United States Patent [19]

Merkus

[11] Patent Number: 4,709,528

[45] Date of Patent: Dec. 1, 1987

[54] APPARATUS FOR PRODUCING BAG PACKAGES HAVING DISPENSING FITMENTS

[75] Inventor: Minne Merkus, Weert, Netherlands

[73] Assignee: Robert Bosch GmbH, Stuttgart, Fed. Rep. of Germany

[21] Appl. No.: 5,988

[22] Filed: Jan. 21, 1987

[30] Foreign Application Priority Data

Apr. 11, 1986 [DE] Fed. Rep. of Germany ....... 3612196

[51] Int. Cl.⁴ ............................................... B65B 9/06
[52] U.S. Cl. ......................................... 53/128; 53/551
[58] Field of Search ................. 53/410, 128, 373, 550, 53/551, 552, 574, 575, 578

[56] References Cited

U.S. PATENT DOCUMENTS

| | | | |
|---|---|---|---|
| 3,244,576 | 4/1966 | Swartz | 53/128 X |
| 3,894,381 | 7/1975 | Christine et al. | 53/128 |
| 4,055,032 | 10/1977 | Hammond | 53/410 |
| 4,246,062 | 1/1981 | Christine | 53/128 X |
| 4,512,136 | 4/1985 | Christine | 53/410 |
| 4,566,250 | 1/1986 | Matsumura et al. | 53/128 |
| 4,603,536 | 8/1986 | de la Poype | 53/410 |
| 4,656,813 | 4/1987 | Baldini et al. | 53/128 X |

Primary Examiner—Robert L. Spruill
Assistant Examiner—Steven P. Weihrouch
Attorney, Agent, or Firm—Edwin E. Greigg

[57] ABSTRACT

An apparatus for producing bag packages which is equipped with a device for fastening dispensing fitments to the bags. The fastening device has a holder for supplying one dispensing fitment at a time to the inside of the tube, formed from a strip of packaging material, and a sealing stamp, which are disposed in the vicinity of a tube former such that they are displaceable toward one another. The holder, which receives one dispensing fitment at a time from a conveyor device, engages the inlet opening of the tube former, while contrarily the sealing stamp is movable from the opposite side toward the outside of the tube, below the apex of a collar of the tube former.

8 Claims, 4 Drawing Figures

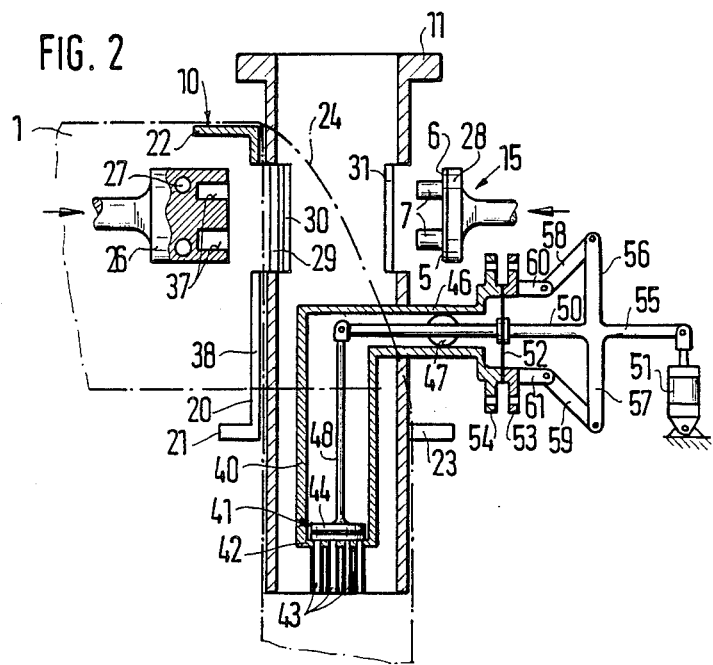
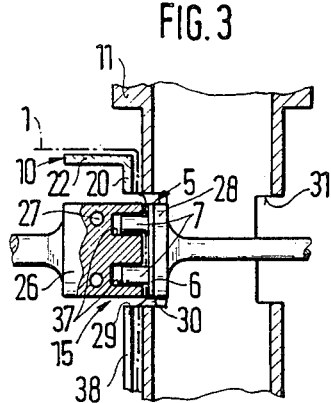
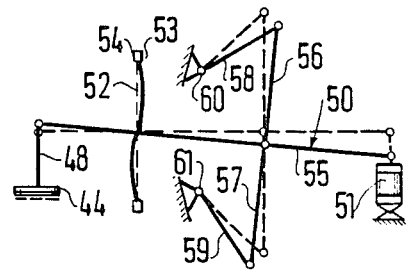

APPARATUS FOR PRODUCING BAG PACKAGES HAVING DISPENSING FITMENTS

BACKGROUND OF THE INVENTION

The invention is based on an apparatus for producing bag packages having dispensing fitments. Apparatuses of this kind are already known (German Pat. Document A No. 1 536 019, U.S. Pat. No. 3,894,481), in which the dispensing fitment is mounted with its flange on the outside of the bag package and is heat sealed to it. Aside from the fact that the rim of the flange offers a ready opportunity for the dispensing fitment to be torn off, it is disadvantageous for the flange to the fastened to the outside of the package because the outside of the packaging material has to be coated in a heat sealable manner, and because it takes a relatively long time to heat seal the flange of the dispensing fitment to the tube, since the heat needed for heat-sealing has to be conducted through the thick flange and then removed again after heat sealing.

OBJECT AND SUMMARY OF THE INVENTION

The apparatus according to the invention has the advantage over the prior art that the sealing time for securing the flange of the dispensing fitment to the material comprising the bag package is the same in terms of duration as the sealing of the lengthwise seam and the crosswise seams of the bag, which assures a high output. It is also advantageous that the fastening device is disposed at a location in which the packaging material has not yet been subjected to the product the package is to contain, so that the product is not affected by the fastening device.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 2 shows the forming and filling device of the apparatus of FIG. 1 in cross section;

FIG. 3 shows part of the apparatus of FIG. 2 in cross section, in a second operating position; and FIG. 4 shows the actuating mechanism of the filling device, in a simplified illustration.

DESCRIPTION OF THE PREFERRED EMBODIMENT

Figure 1:
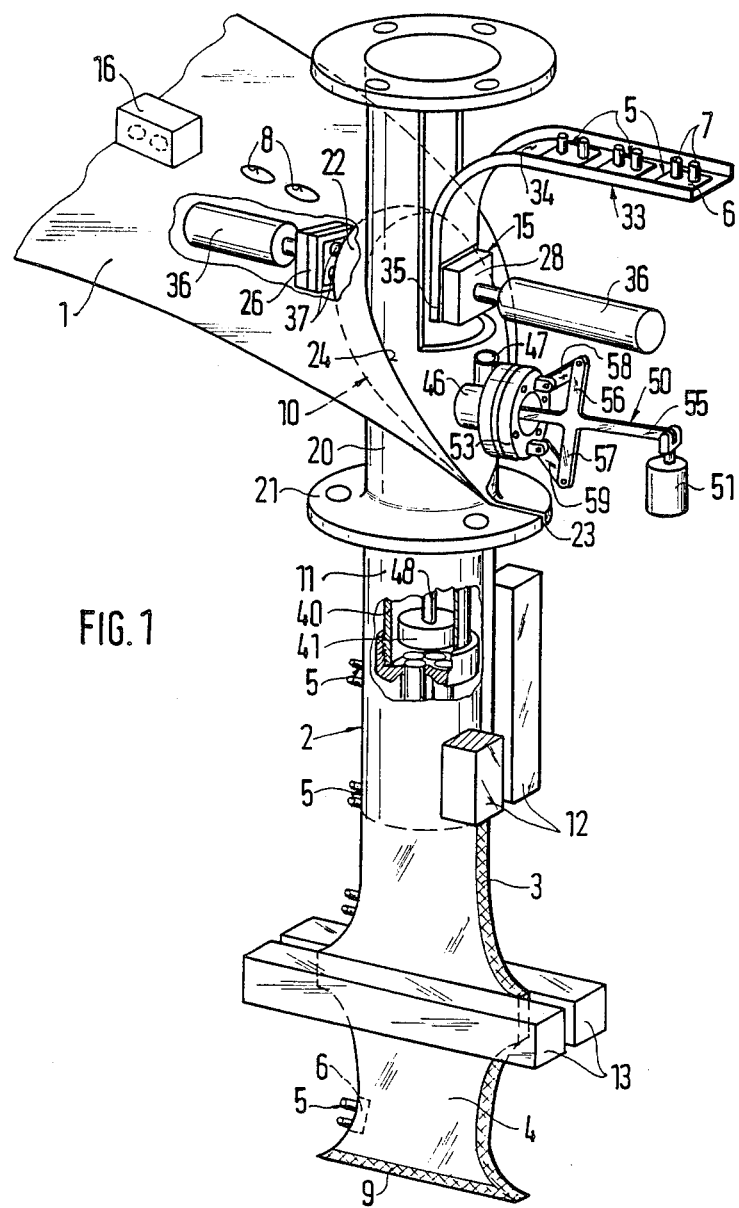
FIG. 1 shows an apparatus for forming, filling and closing of tubular bag packages having a dispensing fitment, in a perspective view.

A strip of packaging material 1 is unwound from a supply roll, not shown, and coated on at least one side so that it is heat-sealable and is guided via a forming shoulder 10, which shapes the material around a forming tube 11 into a tube 2. A pair of jaws 12 for heat-sealing lengthwise seams heat seals the two long edges, placed inside to inside, of the strip of packaging material 1 to form a lengthwise seam 3. A pair of jaws 13 for heat-sealing crosswise seams cuts off the tube 2, after one portion of a product at a time has been introduce into it, to form individual bag packages 4 and pulls the tube 2 downward by one bag length at a time. In the vicinity of the forming shoulder 10, there is a fastening device 15, which when the strip of packaging material 1 is stopped secures one dispensing fitment 5 at a time to the strip of packaging material 1 by heat sealing. The dispensing fitments 5 shown by way of example have two offstanding tubes 7 on each flange 6. The dispensing fitments 5, molded from a thermoplastic plastic, are heat sealed to the strip of packaging material with their flange 6 resting on the inside thereof, while their two tubes 7 protrude through holes 8 in the strip of packaging material 1, which are punched into the strip of packaging material 1 by a stamping device 16 in front of the forming shoulder 10.

The forming shoulder 10 comprises a guidance or tubular fitting 20 surrounding the forming tube 11 with a narrow gap and has a fastening flange 21, and of a collar 22 surrounding the upper inlet opening; the strip of packaging material 1 passes over this collar and its diversion edge 24, which it shares with the inside of the tubular fitting 20, when the tube 2 is being formed. The upper inlet opening of the tubular fitting 20 is inclined relative to the longitudinal axis, so that in the direction of travel of the strip of packaging material, the collar 22 drops off from its apex, on the incoming side of the strip of packaging material, toward the other side. At the lower point on the collar 22, at which the two lengthwise edges of the strip of packaging material 1 are placed inside to inside against one another, the tubular fitting 20 and the flange 21 have a gap 23, through which the offstanding lengthwise edges travel when the strip of packaging material 1, or tube 2, is advanced.

The fastening device 15, which has a heat sealing stamp 26 with a heating device 27 and a holder 28, embodied as a counterpart stamp, for the dispensing fitments 5, is disposed in the upper portion of the forming shoulder 10, and their common working surface is located above the apex of the collar 22 (see FIG. 3). The sealing stamp 26 is disposed on the incoming side of the strip of packaging material 1, and the holder 28 is disposed displaceably on the side of the inlet opening of the forming shoulder 10, such that both the sealing stamp 26 and the holder 28 are displaceable crosswise to the longitudinal axis of the forming shoulder. To reach the strip of packaging material 1 in the working position, recesses 29, 30, 31 are provided in the tubular fitting 20 and in the forming tube 11, these recesses being in alignment with one another and adapted both to the shape of the sealing stamp 26 and holder 28 and to their paths of movement. To convey the dispensing fitments 5 into the working range of the fastening device 15, in particular in front of its holder 28, a conveyor device 33 having a guide groove 34 is disposed above the fastening device 15, the end 35 of the guide groove 34 being located between the forming tube 11 and the end face of the holder 28 in its retracted position (FIG. 1). To move the sealing stamp 26 and the holder 28 back and forth between an initial position, in which the two are remote from one another, and a working position, in which they are pressed together (FIG. 3), the sealing stamp 26 and the holder 28 are each connected to a respective hydraulic or pneumatic actuating cylinder 36. To fasten one dispensing fitment 5, the sealing stamp 26 and the holder 28 are moved toward one another, and located at the end 35 of the conveyor guide groove 34 receives a prepared dispensing fitment 5 and conveys it toward the strip of packaging material 1, whereupon the two tubes 7 of the dispensing fitment 5 penetrate the holes 8 of the positioned strip of packaging material 1 and finally the flange 6 comes to rest on the inside of the strip of packaging material 1, so that with the sealing stamp 26 likewise having been moved into position the flange 6 of the dispensing fitment 5 is pressed to the strip of packaging material 1 and is sealed to it by the transmission of heat by the sealing stamp 26 (FIG. 3). After a pressing time of a certain duration, the holder 28 and the sealing stamp 26 are retracted back out of the working position into their initial position. For receiving the tubes 7 of the fitment 5 during the sealing operation, the sealing stamp 26 has two suitably disposed blind bores 37 in its end face. For retaining a dispensing fitment 5 while it is being conveyed, suction bores, not shown, are provided in the end face of the holder 28; however, it is also possible to insert pins into the end face that slip into the tubes 7 to engage them.

The sealing attachment of a dispensing fitment 5 to the strip of packaging material 1 is effected while the strip of packaging material is at a standstill, during which time the lengthwise seam 3 is also formed by the pair of lengthwise seam sealing jaws 12, and the pair of crosswise seam sealing jaws 13 returns from a lower position to an upper initial position. After the closure of the pair of crosswise seam sealing jaws 13, this pair is moved downward, so that it advances the tube 2 and the strip of packaging material 1 by pulling them down by one bag length at a time, whereupon the tubes 7 of the dispensing fitment that protrude to the outside from the tube 2 are pulled through a lengthwise slit 38 in the tubular fitting 20 of the forming shoulder 10, below the recess 29, and the pair of crosswise sealing jaws 13 cuts off one bag package 4 from the tube 9 subsequent to creating crosswise seams 9.

For filling the bag packages 4 with one amount at a time of a liquid product, a filling tube 40, FIG. 2, is disposed coaxially in the forming tube 11, with an apportioning valve 41 disposed at the lower end of the filling tube. This apportioning valve 41 has a valve seat plate 42 with a plurality of downwardly extending outlet tubes 43 as well as a valve plate 44 that is movable in the filling tube 40 toward the valve seat plate 42. The upper end of the filling tube 40 is slightly below the working range of the fastening device 15 and there communicates with a supply fitting 46 that penetrates the forming tube 11 crosswise. Discharging in turn into this supply fitting 46 is a filling line 47, through which the liquid product to be dispensed into the packages is supplied.

For metering the individual amounts of the product, the valve plate 44 is raised from time to time from the valve seat plate 42. To this end, the valve plate 44 is secured to a rod 48, which extends in the filling tube 40 up to the height of the supply fitting 46 and the upper end of which is pivotably attached to one end of a lever 50. For actuating the lever 50, an adjusting cylinder 51 is pivotably attached to the other end of the lever.

The opening of the supply fitting 46 opposite the filling tube 40 is closed with a flexible wall in the form of a diagraphm 52, which is fastened with a ring flange 53 having a flange 54 to the end of the supply fitting 46. In its middle, the diaphragm 52 is also tightly connected to the lever 50. For pivoting the lever 50 about an axis that passes through the middle of the diaphragm 52, the lever 50 has two crosswise arms 56, 57 on its arm 55 extending outside the supply fitting 46. The ends of the crosswise arms 56, 57 are pivotably attached to connecting rods 58, 59, which are supported on the ring flange 53 in stationary bearings 60, 61. In one position, as shown in FIG. 2., that is, the closing position of the metering valve 41, the two connecting rods 58, 59 assure a position in which their extended longitudinal axes intersect one another at the center point of the diaphragm 52 (see FIG. 2). By means of an adjusting movement of the adjusting cylinder 51, the lever 50 is pivoted clockwise, and with the aforementioned arrangement of the connecting rods 58, 59, the lever 50 is pivoted about an axis extending through the center of the diaphragm 52, and the valve plate 44 is lifted from the valve seat plate 42. To introduce one amount of liquid at a time into the end of the tube 2, the valve plate 44 is raised from the valve seat 42 each time as the tube 2 is being advanced, so that the liquid can flow out of the filling tube 40 and through the outlet tubes 43 into the clamped end of the tube 2.

In addition, it should be noted that with the above-described fastening device, it is also possible, with suitable adaptation of the holder and the stamp, to attach dispensing fitments of some other shape to the tube or to the formed bag packages.

The foregoing relates to a preferred exemplary embodiment, it being understood that other variants and embodiments thereof are possible within the spirit and scope of the invention, the latter being defined by the appended claims.

What is claimed and desired to be secured by Letters Patent of the United States is:

1. An apparatus for producing bag packages (4) from a strip of heat sealable packaging material (1) having long edges which comprises a packaging material former (10) which shapes the strip of packaging material into a tube (2), said packaging material former (10) includes a tube former (11), with a surrounding tubular guide fitting (20), an oblique collar (22) which guides the tube in conjunction with an inlet opening on said guide fitting (20), a lengthwise seam sealing device (12) that joins the long edges of the strip of packaging material, a crosswise sealing and advancing device (13) that advances the tube incrementally and divides the tube into individual bag packages after they have been filled with a product, a dispenser for dispensing fitments to be secured to said packaging material, a device (15) for fastening dispensed fitments (5) to said tube, means for forming holes in said packaging material for receiving said fitments (5) which are secured to said packaging material, said device (15) including a holder (28) that receives one fitment at a time from a conveyor device (33) that conveys said fitment to said holder (28), a heat sealing stamp disposed opposite to said holder (28), said heat sealing stamp including blind bores (37) for receiving tubes of said fitments and a heating device for heating said package material in the vicinity thereof, said securing device (15) is disposed in the vicinity of said packaging material former (10), and an opening (29, 30) in said collar (22) and an opening (31) in said tube former (11), said sealing device (26) is movable into said opening in said collar (22) and said holder (28) is movable into said opening (31) of said tube former (11) toward the inside of the tube (2) being formed, whereby the fitment is secured to the packaging material as a liquid is filled into a previously formed bag.

2. An apparatus as defined by claim 1, in which said heating device (27) is integrated into said stamp (26), which is disposed in alignment with said holder (28) below an apex of said collar (22) of the packaging material former (10).

3. An apparatus as defined by claim 2, wherein said tube former (11) is disposed in the guide fitting (20) of the packaging material former (10) around which said strip of packaging material (1) is formed into a tube (2), and that the tube former (11) has recesses (30, 31) in alignment with the holder (28) and stamp (26).

4. An apparatus as defined by claim 2, in which said guide fitting (20) of the tube former (11) has a recess (29) congruent with the stamp (26), through which recess the stamp (26) is guided toward the outside of the strip of packaging material (1) formed into a tube (2).

5. An apparatus as defined by claim 4, wherein said tube former (11) is disposed in the guide fitting (20) of the packaging material former (10) around which said strip of packaging material (1) is formed into a tube (2), and that the tube former (11) has recesses (30, 31) in alignment with the holder (28) and stamp (26).

6. An apparatus as defined by claim 4, in which said stamp (26) is pressed from outside against said packaging material braced by the holder (28).

7. An apparatus as defined by claim 6, wherein said tube former (11) is disposed in the guide fitting (20) of the packaging material former (10) around which said strip of packaging material (1) is formed into a tube (2), and that the tube former (11) has recesses (30, 31) in alignment with the holder (28) and stamp (26).

8. An apparatus as defined by claim 1, wherein said tube former (11) is disposed in the guide fitting (20) of the packaging material former (10) around which said strip of packaging material (1) is formed into a tube (2), and that the tube former (11) has recesses (30, 31) in alignment with the holder (28) and stamp (26).

* * * * *